US012686793B2

(12) United States Patent (10) Patent No.: US 12,686,793 B2

Li et al. (45) **Date of Patent: \*Jul. 21, 2026**

(54) FREEZE-THAW STABLE WATER-IN-OIL EMULSION CLEANER AND/OR POLISH COMPOSITIONS

(71) Applicant: S. C. Johnson & Son, Inc., Racine, WI (US)

(72) Inventors: Bing Li, Franklin, WI (US); Christie M. Mueller, Milwaukee, WI (US); Loretta G. Lynch, Racine, WI (US); Becca B. Taylor, Milwaukee, WI (US)

(73) Assignee: S. C. JOHNSON & SON, INC., Racine, WI (US)

( * ) Notice: Subject to any disclaimer, the term of this patent is extended or adjusted under 35 U.S.C. 154(b) by 367 days.

This patent is subject to a terminal disclaimer.

(21) Appl. No.: 17/587,080

(22) Filed: Jan. 28, 2022

(65) Prior Publication Data

US 2022/0145133 A1    May 12, 2022

Related U.S. Application Data

(63) Continuation of application No. 15/813,894, filed on Nov. 15, 2017, now Pat. No. 11,773,293.

(51) Int. Cl.
C09G 1/12 (2006.01)
C09G 1/04 (2006.01)
(Continued)

(52) U.S. Cl.
CPC ................. C09G 1/12 (2013.01); C09G 1/04 (2013.01); C09K 3/30 (2013.01); C09K 23/003 (2022.01);
(Continued)

(58) Field of Classification Search
CPC . C09G 1/04; C09G 1/12; C09K 23/00; C09K 23/003; C09K 3/30; C09K 23/34;
(Continued)

(56) References Cited

U.S. PATENT DOCUMENTS

| 2,008,939 A | 7/1935 | Tufts | |
| 3,923,970 A | * 12/1975 | Breuer ................... | A61K 8/361 |
| | | | 424/47 |

(Continued)

FOREIGN PATENT DOCUMENTS

| CN | 1354213 A | 6/2002 |
| CN | 105586159 A | 5/2016 |

(Continued)

OTHER PUBLICATIONS

S. Ghosh et al.: Abstract—Freeze-thaw stability of water-in-oil emulsions, Journal of Colloid and Interface Science, vol. 339, Issue 1, Nov. 1, 2009, pp. 91-102.

*Primary Examiner* — Shuangyi Abu Ali
(74) *Attorney, Agent, or Firm* — Quarles & Brady LLP

(57) ABSTRACT

Water-in-oil (W/O) emulsion compositions having freeze-thaw stability are provided which include water, at least one hydrocarbon solvent, at least one nonionic emulsifier, and at least one freeze-thaw stabilizer which either prevents breaking of the emulsion after a freeze-thaw cycle or enables the emulsion to be re-formed following breaking after a freeze-thaw cycle by simple shaking of the emulsion composition. Preferred freeze-thaw stabilizers are polyols (e.g., glycerin), sugars (e.g., sucrose), polar aprotic solvents (e.g., dimethyl sulfoxide) and amphoteric compounds (e.g., lauryl dimethyl amine oxide). The freeze-thaw stabilizers are particularly useful in furniture care, shoe care and auto care cleaning and/or polishing products including therein water, hydrocarbon solvent(s), nonionic emulsifier(s) and additives, such as (Continued)

film former(s), surfactant(s), fragrance component(s) and preservative(s).

13 Claims, 1 Drawing Sheet

(51) Int. Cl.

| | |
|---|---|
| *C09K 3/30* | (2006.01) |
| *C09K 23/00* | (2022.01) |
| *C09K 23/34* | (2022.01) |
| *C11D 3/20* | (2006.01) |
| *C11D 3/22* | (2006.01) |
| *C11D 3/43* | (2006.01) |
| *C11D 17/00* | (2006.01) |

(52) U.S. Cl.
CPC ............ *C09K 23/34* (2022.01); *C11D 3/2065* (2013.01); *C11D 3/221* (2013.01); *C11D 3/43* (2013.01); *C11D 17/0017* (2013.01); *C11D 17/0043* (2013.01)

(58) Field of Classification Search
CPC ............ C11D 17/0017; C11D 17/0043; C11D 3/2065; C11D 3/221; C11D 3/43
See application file for complete search history.

(56) References Cited

U.S. PATENT DOCUMENTS

| | | | |
|---|---|---|---|
| 4,022,736 | A | 5/1977 | Schmitt |
| 4,073,411 | A | 2/1978 | Doumani |
| 4,101,441 | A | 7/1978 | Hwa et al. |
| 4,163,673 | A | 8/1979 | Dechert |
| 4,188,376 | A | 2/1980 | Payne et al. |
| 4,354,871 | A | 10/1982 | Sutton |
| 4,420,329 | A | 12/1983 | Laughlin |
| 4,436,754 | A | 3/1984 | Jacobs |
| 4,486,333 | A | 12/1984 | Sebba |
| 4,606,913 | A | 8/1986 | Aronson et al. |
| 4,732,612 | A | 3/1988 | Steer et al. |
| 4,743,648 | A | 5/1988 | Hill et al. |
| 4,880,557 | A | 11/1989 | Ohara et al. |
| 5,017,222 | A | 5/1991 | Cifuentes et al. |
| 5,085,694 | A | 2/1992 | Cifuentes |
| 5,110,891 | A | 5/1992 | Cifuentes et al. |
| 5,129,947 | A | 7/1992 | Sharma et al. |
| 5,154,759 | A | 10/1992 | Cifuentes et al. |
| 5,425,804 | A | 6/1995 | Shinohara et al. |
| 5,681,377 | A | 10/1997 | Lohr et al. |
| 5,705,470 | A | 1/1998 | Faris |
| 5,753,607 | A | 5/1998 | Burke et al. |
| 5,849,838 | A | 12/1998 | Barlow |
| 5,913,969 | A | 6/1999 | Howe |
| 5,925,607 | A | 7/1999 | Flanagan |
| 5,932,328 | A | 8/1999 | Burke et al. |
| 5,954,864 | A | 9/1999 | Roe et al. |
| 5,972,876 | A | 10/1999 | Robbins et al. |
| 5,977,050 | A | 11/1999 | Faris |
| 6,022,727 | A | 2/2000 | Worden et al. |
| 6,165,479 | A | 12/2000 | Wheeler |
| 6,214,784 | B1 | 4/2001 | Robbins et al. |
| 6,333,362 | B1 | 12/2001 | Lorant |

| | | | |
|---|---|---|---|
| 6,620,855 | B2 | 9/2003 | Lorant |
| 6,652,632 | B2 | 11/2003 | Moodycliffe et al. |
| 6,673,761 | B2 | 1/2004 | Mitra et al. |
| 6,749,673 | B2 | 6/2004 | Timothy, I et al. |
| 6,825,158 | B2 | 11/2004 | Mitra et al. |
| 6,830,609 | B2 | 12/2004 | Bedford et al. |
| 6,841,527 | B2 | 1/2005 | Mitra et al. |
| 6,881,757 | B2 | 4/2005 | Moodycliffe et al. |
| 6,913,711 | B2 | 7/2005 | McKie et al. |
| 6,951,834 | B2 | 10/2005 | Mitra et al. |
| 7,001,463 | B2 | 2/2006 | Jones |
| 7,053,124 | B2 | 5/2006 | Mercurio |
| 7,345,015 | B1 | 3/2008 | Kong et al. |
| 7,378,382 | B2 | 5/2008 | Serobian et al. |
| 7,396,808 | B1 | 7/2008 | Hood et al. |
| 7,405,242 | B2 | 7/2008 | Mercurio et al. |
| 7,414,017 | B2 | 8/2008 | Kong et al. |
| 7,465,700 | B1 | 12/2008 | Ochomogo et al. |
| 7,511,006 | B2 | 3/2009 | Shimmin et al. |
| 7,521,413 | B2 | 4/2009 | Ochomogo et al. |
| 7,527,060 | B2 | 5/2009 | Hood et al. |
| 7,576,047 | B2 | 8/2009 | Kilkenny et al. |
| 7,628,999 | B2 | 12/2009 | Sunkara |
| 7,696,145 | B2 | 4/2010 | Kaaret |
| 7,741,263 | B2 | 6/2010 | Kilkenny et al. |
| 7,799,751 | B2 | 9/2010 | Kilkenny et al. |
| 8,029,812 | B2 | 10/2011 | Sunkara |
| 8,158,108 | B2 | 4/2012 | Valpey, III et al. |
| 8,168,578 | B2 | 5/2012 | Serobian |
| 8,178,078 | B2 | 5/2012 | Clark et al. |
| 8,545,815 | B2 | 10/2013 | Valpey, III et al. |
| 8,623,953 | B2 | 1/2014 | Butuc |
| 8,691,248 | B2 | 4/2014 | Patel |
| 8,865,132 | B2 | 10/2014 | Valpey, III et al. |
| 9,044,414 | B2 | 6/2015 | Clark et al. |
| 9,271,903 | B2 | 3/2016 | Patel |
| 9,364,007 | B2 | 6/2016 | Clark et al. |
| 2002/0183233 | A1 | 12/2002 | Mitra et al. |
| 2003/0100465 | A1 | 5/2003 | Kilkenny et al. |
| 2003/0109411 | A1 | 6/2003 | Kilkenny et al. |
| 2004/0002550 | A1 | 1/2004 | Mercurio |
| 2004/0102562 | A1 | 5/2004 | Butuc |
| 2004/0116544 | A1 | 6/2004 | Mercurio |
| 2006/0165627 | A1 | 7/2006 | Allef et al. |
| 2006/0166849 | A1 | 7/2006 | Kilkenny et al. |
| 2008/0132634 | A1 | 6/2008 | Butue |
| 2009/0022676 | A1 | 1/2009 | Butuc |
| 2009/0318321 | A1 | 12/2009 | Hood et al. |
| 2010/0330139 | A1 | 12/2010 | Shimmin et al. |
| 2013/0109794 | A1 | 5/2013 | Polzin et al. |
| 2014/0135405 | A1 | 5/2014 | Lee |
| 2015/0126479 | A1 | 5/2015 | Premachandran et al. |
| 2016/0128916 | A1 | 5/2016 | Patel |

FOREIGN PATENT DOCUMENTS

| | | | |
|---|---|---|---|
| JP | 56-24034 | A | 3/1981 |
| JP | 2001-72963 | A | 3/2001 |
| JP | 2004224706 | A | 8/2004 |
| JP | 2007-161929 | A | 6/2007 |
| JP | 2013-177484 | A | 9/2013 |
| WO | 9618383 | A1 | 6/1996 |
| WO | 2004092290 | A1 | 10/2004 |
| WO | 2007141475 | A2 | 12/2007 |

* cited by examiner

FREEZE-THAW STABLE WATER-IN-OIL EMULSION CLEANER AND/OR POLISH COMPOSITIONS

RELATED APPLICATION

The present application is a continuation of U.S. Ser. No. 15/813,894 filed Nov. 15, 2017 entitled "FREEZE-THAW STABLE WATER-IN-OIL EMULSION CLEANER AND/ OR POLISH COMPOSITIONS".

FIELD OF THE INVENTION

The invention is directed to water-in-oil (W/O) emulsion compositions including water, at least one hydrocarbon solvent, at least one nonionic emulsifier, and at least one stabilizer to provide freeze-thaw stability to the W/O emulsion. When the W/O emulsion composition is subjected to a freeze-thaw cycle, the freeze-thaw stabilizer(s) will either prevent the emulsion from breaking or enable the emulsion to be re-formed by simple shaking of a container containing the emulsion composition. The stabilized W/O emulsion compositions of the invention are particularly suitable for use as cleaning and/or polish compositions, more specifically useful in compositions for cleaning and/or polishing furniture, shoes and automobiles.

BACKGROUND OF THE INVENTION

It has been noticed that when a typical water-in-oil (W/O) emulsion composition goes through a freeze-thaw cycle, the emulsion usually breaks, i.e., the water phase will no longer be uniformly dispersed throughout the composition, but rather a large amount of water remains in the bottom portion of a container holding the composition. Freeze-thaw cycles are typically encountered during wintertime shipments or warehouse storage of the products containing the emulsion compositions. This is undesirable for a consumer product because the composition will no longer be delivered, in a form which will provide performance as expected by the consumer, regardless of whether the composition is delivered in aerosol form or non-aerosol form such as a pump spray, a trigger spray, a pour bottle or a squeeze bottle.

A freeze-thaw stable W/O emulsion is desirable so that the emulsion can maintain the same emulsion structure upon being subjected to a freeze-thaw cycle or can be re-formed following breaking by simple shaking of the container holding the emulsion composition. A user can then experience the expected and desired performance of the composition.

One effort to provide a freeze-thaw stable W/O emulsion is disclosed in U.S. Pat. No. 4,073,411 which is directed to a cookware lubricant product. A freeze-thaw stable W/O lecithin emulsion is described, including the addition of a polyol to the W/O lecithin emulsion system in which both components and concentrations are controlled to maintain a critical acid number level to inhibit or prevent these W/O emulsions from a "breaking" reversion to a watery, oil-in-water heterogeneity despite repeated cycling through freeze-thaw conditions. Although a stable W/O lecithin emulsion was obtained, the strict requirement on the "critical Acid No. level" in accordance with the description greatly limits the application of the described method to other emulsion systems.

Another effort is disclosed in US Patent Application Publication No. 2014/0135405 A1 directed to a cosmetic product. Freeze-thaw stable water-in-silicone oil emulsions are described. Glycerin was used as the freeze-thaw stabilizer to prevent the emulsions from breaking after the freeze-thaw cycles. Other polyols, lower alcohols, organic acid salts or inorganic salts were combined with glycerin to improve the freeze-thaw stability. Although freeze-thaw stable emulsions were obtained by this method, the unusual water-in-silicone oil emulsions are difficult to use in other product categories due to the high cost.

In the food industry, many W/O emulsion-based processed foods (e.g., whipped toppings, tablespreads and sauces) are frozen to improve their long-term storage before thawing for further processing or consumption. In the article "Freeze-thaw stability of water-in-oil emulsions" by S. Ghosh and D. Rousseau, *Journal of Colloid and Interface Science*, Volume 339, Issue 1 (2009) pages 91-102, factors were assessed which influence W/O emulsion stability during freeze-thaw cycles, namely interfacial crystallization vs. network crystallization and the sequence of crystallization events (i.e., dispersed vs. continuous phase or vice versa). It was reported that destabilization was most apparent with a liquid-state emulsifier and a continuous oil phase that solidifies prior to the dispersed phase. Emulsions stable to freeze-thaw cycles were obtained when the emulsifier crystallizes at the oil-water interface or in emulsions where the continuous phase crystallizes after the dispersed aqueous phase. This method might be good guidance for food products, but is not so effective in other product categories.

In furniture care, shoe care and auto care products, waxes and methanol have served as the stabilizers to create freeze-thaw stable W/O emulsions. These freeze-thaw stabilizers, however, usually cannot prevent an emulsion from breaking, but will allow the emulsion to be re-formed by simple shaking of the container holding such emulsion. The disadvantages of using a wax as a freeze-thaw stabilizer include the build-up of wax left on the treated surface and the need for a greater effort by a user to achieve complete wipeout of the composition during application and use. Methanol inclusion in the composition results in government regulatory issues in countries such as Russia, as well as a potential safety hazard being present during manufacture of the product.

Accordingly, emulsion compositions which can either prevent the emulsion from breaking or enable an emulsion following breaking to be re-formed by simple shaking of the composition, would be advantageous, particularly in furniture care, shoe care and auto care products where easier wipeout would also be provided while avoiding regulatory issues and potential safety hazards. The present invention provides new W/O emulsion compositions that are stable to freeze-thaw cycles and can address issues in the prior art. Further, the invention provides new W/O emulsion compositions that can be re-formed by simple shaking of the compositions after breaking via freeze-thaw cycles.

SUMMARY OF THE INVENTION

The invention involves water-in-oil (W/O) emulsion compositions including water, at least one hydrocarbon solvent, at least one nonionic emulsifier, and at least one freeze-thaw stabilizer, and whereupon the W/O emulsion composition is subjected to a freeze-thaw cycle, either the emulsion is prevented from breaking or the emulsion once broken is enabled to be re-formed by simple shaking of the container containing the emulsion composition. Other components may be included in the emulsion compositions as described below.

The W/O emulsion compositions are prepared by dispersing a water phase in an oil phase. The oil phase includes at least one hydrocarbon solvent and at least one nonionic emulsifier. Freeze-thaw stabilizers suitable for inclusion in the composition are (1) polyols, for example, glycerin, sorbitol, and maltitol (2) sugars, for example, glucose and sucrose, (3) polar aprotic solvents, for example, dimethyl sulfoxide (DMSO), and (4) amphoteric compounds, for example, lauryl dimethyl amine oxide. Depending on the type of freeze-thaw stabilizer(s) used and the composition of the W/O emulsion, a lower or higher concentration of the freeze-thaw stabilizer(s) will be utilized. Generally, it can be understood that a higher concentration of the freeze-thaw stabilizer is used to prevent an emulsion from breaking, while a lower concentration of the stabilizer will enable the emulsion to be re-formed by simple shaking of the container holding the emulsion composition. In the commercial world, this lower concentration is usually preferred by companies because of the lower cost. If the concentration of the freeze-thaw stabilizer is too low, the emulsion composition loses its freeze-thaw stability and will not be able to be re-formed as an emulsion by simple shaking.

The W/O emulsion composition of the invention is particularly useful in furniture care, shoe care and auto care products. A typical furniture care, shoe care and auto care product including a W/O emulsion as part thereof includes water, at least one hydrocarbon solvent, at least one nonionic emulsifier, at least one freeze-thaw stabilizer, and, optionally, one or more of a film former such as silicone oils, a fragrance component, preservative, or adjuvant as conventional for inclusion in a furniture care, shoe care and auto care cleaning and/or polishing composition.

DETAILED DESCRIPTION OF THE INVENTION

Figure 1:
FIG. 1 shows a W/O emulsion composition not containing a freeze-thaw stabilizer prior to going through a freeze-thaw cycle, i.e., where the liquid phase is uniformly dispersed throughout the oil phase.
Figure 2:
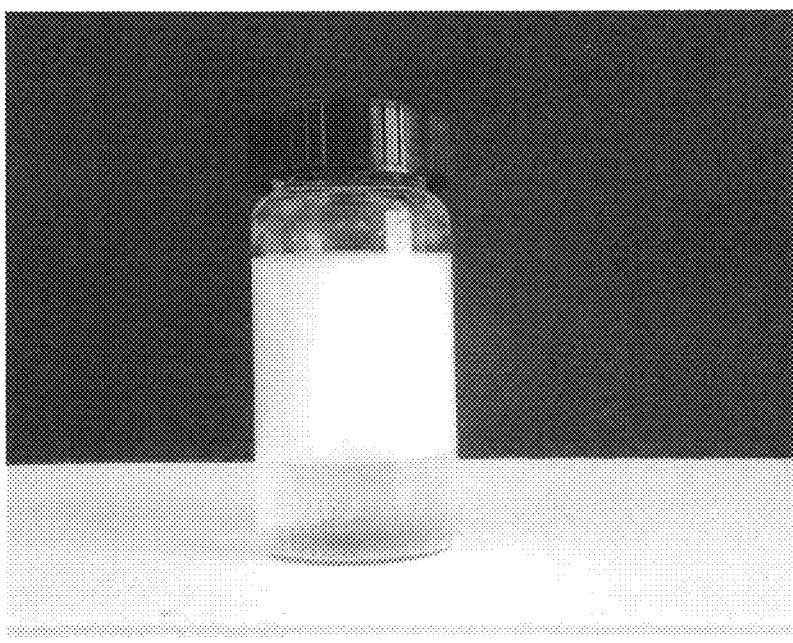
FIG. 2 shows the W/O emulsion composition of FIG. 1 after the composition has gone through a freeze-thaw cycle and the emulsion has broken, i.e., part of the water phase has separated from the oil phase and can be seen in the bottom portion of the container.

Freeze-thaw stable water-in-oil (W/O) emulsion compositions are described. These stable emulsions are provided by using a type of functional ingredients called "freeze-thaw stabilizers". These freeze-thaw stabilizers serve either to prevent the emulsion from breaking following being subjected to a freeze-thaw cycle or to enable the emulsion to be re-formed following breaking by simple shaking (i.e., shaking manually or by hand) of the container in which the broken emulsion is held. FIG. 1 shows a W/O emulsion composition containing a hydrocarbon solvent, a nonionic emulsifier and water, but not containing any freeze-thaw stabilizer, wherein the water phase is uniformly dispersed in the oil phase, i.e., the emulsion is not broken. FIG. 2 shows the W/O emulsion of FIG. 1 following being subjected to a freeze-thaw cycle and the emulsion being broken, i.e., part of the water phase has separated out of the emulsion composition and is now present in the bottom portion of the container. When at least one of the freeze-thaw stabilizers of the invention are included in the W/O emulsion composition, the emulsion depending on the concentration at which the freeze-thaw stabilizer is present, will either not break upon being subjected to a freeze-thaw cycle and remain as shown in FIG. 1, or be broken as shown in FIG. 2, but can be re-formed as the emulsion shown in FIG. 1 by simple shaking of the container holding the emulsion composition. With either occurrence, the consumer will be able to continue to experience the expected performance of the emulsion composition when used.

Emulsion compositions in which the freeze-thaw stabilizers of the invention are especially beneficial in use are furniture care, shoe care and auto care products, such as compositions for cleaning and/or polishing furniture, shoes and automobiles. Furniture care, shoe care and auto care products based on W/O emulsions include generally water, hydrocarbon solvent(s), nonionic emulsifier(s), and, optionally, one or more of film former(s), fragrance component(s), preservative(s), and other additives conventionally included in products for cleaning and/or polishing furniture, shoes and automobiles.

Freeze-thaw stabilizers of the invention for inclusion in a W/O emulsion composition include (a) polyols (i.e., compounds having at least 2 hydroxyl groups), for example glycerin, ethylene glycol, sorbitol and maltitol, (b) sugars, for example glucose and sucrose, (c) polar aprotic solvents, for example dimethyl sulfoxide (DMSO), and (d) amphoteric compounds, for example, lauryl dimethyl amine oxide. Generally, inclusion of a higher concentration of the freeze-thaw stabilizer in the emulsion composition can prevent the W/O emulsion from breaking, while a lower concentration of the stabilizer enables a broken emulsion to be re-formed by simple shaking of the container holding the emulsion composition. If the concentration of the freeze-thaw stabilizer is too low, the emulsion is not freeze-thaw stable, i.e., the emulsion cannot be re-formed by simple shaking following being broken in a freeze-thaw cycle. So there is a minimal concentration required to enable freeze-thaw stability. The minimal concentration of the freeze-thaw stabilizer(s) may vary based on the emulsion systems. A preferred concentration range for use is about 0.01 to about 10 wt. % of the freeze-thaw stabilizer(s), with a more preferred concentration range being from about 0.1 to about 2 wt. %, and a most preferred range being about 0.1 to about 1 wt. %. The freeze-thaw stabilizers can be used alone or in combination.

Weight percent (wt. %) of the total W/O emulsion compositions as used in the description and the claims is based on 100 wt. %. The ingredient wt. % given, unless otherwise noted, is based on the wt. % of the active(s) of the ingredient.

As to hydrocarbon solvents suitable for use in the W/O emulsion compositions, especially in relation to emulsion compositions useful as a product for cleaning and/or polishing furniture, shoes and automobiles, they are those known to typically be utilized in conventional furniture care, shoe care and auto care compositions for purposes of removing solvent-soluble residues from substrate surfaces. Examples of hydrocarbon solvents useful alone or in combination include, but are not limited to, saturated (e.g., alkanes) and unsaturated (e.g., alkenes, alkynes and aromatics) hydrocarbon solvents.

A wide variety of commercially-available saturated hydrocarbon solvents, such as those commercially available from ExxonMobil under the "ISOPAR" tradename or the EXXSOL tradename, as well as the isoparaffinic-type hydrocarbon solvents commercially available from Chevron Phillips under the "SOLTROL" tradename, are presently preferred because they are nearly odor-free. Preferred solvents are those having a lower carbon length (i.e., $C_{10}$ or less).

Other suitable saturated hydrocarbon solvents include pentane, hexane, heptane, naphtha, mineral spirit and mineral oil.

Examples of unsaturated hydrocarbon solvents useful alone or in combination include, but are not limited to, turpentine, toluene and xylene.

The various saturated and unsaturated hydrocarbon solvents can be utilized alone or in combination. The one or more solvents are preferably present in an amount of about 3 to about 40 wt. %, more preferably about 5 to about 20 wt. %, and most preferably about 8 to about 12 wt. %.

W/O emulsion compositions of the invention, including products for cleaning and/or polishing furniture, shoes and automobiles, include at least one nonionic emulsifier to produce the emulsion.

An emulsion involves a stable mixture of two or more mutually immiscible liquids held in suspension by small percentages of substances called emulsifiers. All W/O emulsions are characterized as comprising a continuous oil phase and a discontinuous water phase which is dispersed throughout the continuous oil phase.

The nonionic emulsifiers suitable for use include those commonly employed in furniture care, shoe care and auto care products. Such conventional emulsifiers can be used alone or in combination. Preferred emulsifiers for use have an Hydrophilic-lipophilic-Balance (HLB) value of about 2 to about 6.

Examples of nonionic emulsifiers useful alone or in combination include, but are not limited to, sorbitan esters of oleic and lauric acids, polyethoxylated sorbitan esters having up to 20 ethoxy units, monoglycerides and diglycerides of fat-forming fatty acids, and combinations thereof.

Additional examples of optional commercially-available nonionic emulsifiers include emulsifiers sold under the trade names "SPAN" and "TWEEN", both presently available from Croda, Inc. Particular examples of such emulsifiers include sorbitan monooleate, sorbitan monolaurate, and sorbitan monopalmitate. Mixtures of the various above-mentioned emulsifiers can also be utilized.

At least one nonionic emulsifier is preferably present in an amount of about 0.01 to about 5 wt. %, more preferably about 0.1 to about 2 wt. %, and most preferably about 0.1 to about 1 wt. %.

The water component making up the liquid phase of the emulsion may be deionized water, reverse osmosis water, distilled water, tap water and/or the like. Water makes up the balance of the emulsion composition based on 100 wt. %, and is preferably present in an amount of about 10 to less than 100 wt. %, more preferably about 50 to about 95 wt. %, and most preferably about 70 to about 90 wt. %.

One or more of certain optional ingredients may also be included in the emulsion compositions of the invention.

Film formers suitable for use in the present invention include silicones and waxes. They are able to provide enhanced shine/gloss to the surface.

The silicones useful in the present invention include the low viscosity silicone fluids, which have viscosities of about 5 to about 5,000 centistokes (cSt), preferably about 100 to 1000 cSt.

The silicones useful in the present invention can be substituted with any organo-group known in the silicone art. Further noted are silicone gums. Silicone gum normally refers to a high molecular weight linear polysiloxane or silicone that can be converted from its highly plastic state into a predominantly elastic state by cross-linking.

The silicone component is preferably present in an amount of about 0.1 to about 20 wt. %, more preferably about 1 to about 11 wt. %, and most preferably about 3 to about 7 wt. %.

Conventional waxes suitable for use include, but are not limited to, certain synthetic waxes such as microcrystalline waxes and petroleum waxes, as well as certain natural waxes such as "carnauba" waxes. The wax component is preferably present in an amount of about 0.05 to about 2.0 wt. % wax, preferably from about 0.05 to about 0.5 wt. % wax based upon total weight of the emulsion composition.

One or more of still other known additives, including but not limited to, solvents, surfactants, fragrance components, preservatives and, colorants, may be added to the emulsion compositions.

Solvent(s) can be included to increase the cleaning power of the emulsion. Examples of solvents suitable for use include, but are not limited to, oxygenated solvents, such as ethyl alcohol.

Surfactant(s) can be included to increase the cleaning power of the emulsion. Examples of surfactants suitable for use include anionic, cationic and amphoteric surfactants.

Examples of useful anionic surfactants include, but are not limited to, certain alkali metal alkyl sulfates (e.g., sodium lauryl sulfate) and alkali metal alkyl ether sulfates, sulfosuccinates containing polyethylene glycol moieties attached thereto, and alkyl aryl sulfonates. Mixtures of these surfactants can also be utilized in the present invention.

An example of cationic surfactants suitable for use include certain quaternary ammonium compounds such as the quaternary ammonium halides, the quaternary ammonium sulfates, so-called "fatty" amines which are ethoxylated and have about 2 to about 10 moles of ethylene oxide, and chloride salts or acetate salts of such amines. Various mixtures or combinations of the above-noted surfactants can also be utilized.

Examples of amphoteric surfactants suitable for use include, but are not limited to, cocamidopropyl betaines. When an amphoteric surfactant is included in an emulsion system, this amphoteric compound may serve as the freeze-thaw stabilizer at the same time. No additional freeze-thaw stabilizer may be needed to enable the freeze-thaw stability.

A fragrance component is understood to include one or a mixture of fragrances or perfumes which impart a desired scent. Conventional fragrance components suitable for use are well known to those skilled in the art and accordingly are not described in detail herein. The fragrance component is typically present in an amount that is effective for imparting a desired scent intensity, and can range, for example, preferably from about 0.01 to about 10 wt. %, and more preferably from about 0.01 to about 1 wt. % of the emulsion composition.

Preservatives as commercially available can be included to prolong the shelf life of the emulsion composition such as Bronopol (2-bromo-2-nitropropane-1,3-diol) as sold under the trade name PROTECTOL BN by BASF and BIOBAN BP-PLUS by the Dow Chemical Company. A preservative can be present in an amount of preferably about 0.001 to about 5 wt. %.

Furniture care, shoe care or auto care emulsion products including at least one freeze-thaw stabilizer of the invention can be an aerosol, or a non-aerosol such as a pump spray, a trigger spray, a pour bottle or a squeeze bottle.

An aerosol furniture care, shoe care or auto care product will include a propellant and an intermediate composition which is a W/O emulsion composition. The propellant can be one or more compressed gas propellants, for example, nitrogen, air, carbon dioxide, nitrous oxide, argon, or mixtures thereof; or a liquid or liquefied petroleum gas (LPG), such as hydrocarbon (e.g., butane, propane, isobutane, and mixtures thereof), dimethyl ether, methyl ethyl ether, etc. as conventionally known for use. The one or more propellants are present in a product in an amount of about 0.1 to about 25 wt. % based on the total aerosol formula composition. Compressed gas propellants are generally present in a lower range of about 0.1 to about 2 wt. %, and more preferably about 0.5 to about 1 wt. %. LPG propellants are present in a higher range of about 4 to about 25 wt. %, more preferably about 6 to about 15 wt. %.

Several base formulas of the W/O emulsions are set forth below. They are commonly found in furniture care, shoe care and auto care products. No freeze-thaw stabilizer is included in these base formulas.

Base A

| Ingredient Name | Component Type | Wt. % |
|---|---|---|
| Tap water | Water | 85.00 |
| ISOPAR E (C7-C9 branched alkanes) | Hydrocarbon solvent | 14.00 |
| SPAN 80 (sorbitan monooleate) | Nonionic emulsifier | 1.00 |

Base B

| Ingredient Name | Component Type | Wt. % |
|---|---|---|
| Tap water | Water | 81.00 |
| ISOPAR E (C7-C9 branched alkanes) | Hydrocarbon solvent | 14.00 |
| SPAN 80 (sorbitan monooleate) | Nonionic emulsifier | 1.00 |
| Silicone oil, 100 cSt | Film former | 4.00 |

Base C

| Ingredient Name | Component Type | Wt. % |
|---|---|---|
| Tap water | Water | 84.75 |
| ISOPAR E (C7-C9 branched alkanes) | Hydrocarbon solvent | 14.00 |
| SPAN 80 (sorbitan monooleate) | Nonionic emulsifier | 0.90 |
| STEPANOL WA-EXTRA PCK (sodium lauryl sulfate, 29%) | Anionic surfactant | 0.35 |

Base D

| Ingredient Name | Component Type | Wt. % |
|---|---|---|
| Tap water | Water | 79.00 |
| ISOPAR E (C7-C9 branched alkanes) | Hydrocarbon solvent | 18.00 |
| Ethanol | Oxygenated solvent | 2.00 |
| SPAN 80 (sorbitan monooleate) | Nonionic emulsifier | 1.00 |

Base E

| Ingredient Name | Component Type | Wt. % |
|---|---|---|
| Deionized water | Water | 71.80 |
| White mineral oil | Hydrocarbon solvent | 19.00 |
| ISOPAR E (C7-C9 branched alkanes) | Hydrocarbon solvent | 8.00 |
| SPAN 80 (sorbitan monooleate) | Nonionic emulsifier | 0.80 |
| Fragrance | Fragrance | 0.40 |

The inventive freeze-thaw stabilizers were added to the above formulas Base A-E at selected concentrations. These test samples were prepared by filling glass containers with the base formula and the selected freeze-thaw stabilizer(s). The test samples were then stored in a refrigerator freezer at −18° C. for at least 12 hours. The test samples were then allowed to thaw at room temperature (i.e., about 22° C.) for at least 6 hours or until the temperature of the test samples reached room temperature. The test samples were inspected. When the emulsion was broken, the test sample was shaken by hand to find out whether the emulsion could be re-formed. The test results are summarized below in Table 1.

TABLE 1

Summary of the freeze-thaw test results

| Test number | Base formula | Freeze-thaw stabilizer | Stabilizer concentration (wt. %) | Freeze-thaw test result |
|---|---|---|---|---|
| 1 | A | None | N/A | Fail |
| 2 | A | Glycerin | 0.5 | Pass(B) |
| 3 | A | Ethylene glycol | 1.0 | Pass(B) |
| 4 | A | D-sorbitol | 1.0 | Pass(B) |
| 5 | A | Sucrose | 1.0 | Pass(B) |
| 6 | A | DMSO | 1.0 | Pass(B) |
| 7 | A | Lauryl dimethyl amine oxide | 0.1 | Pass(B) |
| 8 | A | Glucose | 1.0 | Pass(B) |
| 9 | B | None | N/A | Fail |
| 10 | B | Glycerin | 1.0 | Pass(B) |
| 11 | C | None | N/A | Fail |
| 12 | C | Glycerin | 2.0 | Pass(A) |
| 13 | D | None | N/A | Fail |
| 14 | D | Glycerin | 1.0 | Pass(B) |
| 15 | E | None | N/A | Fail |
| 16 | E | Glycerin | 0.5 | Fail |
| 17 | E | Glycerin | 1.0 | Pass(B) |
| 18 | E | Glycerin | 3.0 | Pass(A) |
| 19 | E | Glycerin, D-sorbitol | 1.0, 2.0 | Pass(A) |

Note: In Table 1, (1) "Fail" means that the test sample became a broken emulsion after the freeze-thaw cycles and the emulsion could not be re-formed by simple shaking of the container; (2) "Pass(A)" means that the test sample remained a stable emulsion after the freeze-thaw cycle; and (3) "Pass(B)" means that the test sample became a broken emulsion after the freeze-thaw cycle, but the emulsion was re-formed by simple shaking of the container.

Test samples 1-8 were designed to demonstrate the efficacy of the inventive freeze-thaw stabilizers. These test samples included the Base A formula. Base A includes all three required ingredients which are critical to form a W/O emulsion. Base A is not freeze-thaw stable. After Base A went through the freeze-thaw cycle, the emulsion broke and could not be re-formed by simple shaking of the container. However, freeze-thaw stability was imparted to Base A by adding one of the following freeze-thaw stabilizers: glycerin, ethylene glycol, D-sorbitol, sucrose, glucose, DMSO and lauryl dimethyl amine oxide.

Test samples 9-19 were designed to demonstrate that the inventive freeze-thaw stabilizers can work in a variety of emulsion systems containing optional ingredients.

Test samples 9-10 included the Base B formula. The Base B formula contains an optional film former, silicone 100 cSt. Base B is not freeze-thaw stable, but the addition of 1.0 wt. % glycerin to Base B allowed the re-formation of the emulsion by simple shaking after breaking.

Test samples 11-12 included the Base C formula. The Base C formula contains an optional anionic surfactant, sodium lauryl sulfate. Base C is not freeze-thaw stable, but the addition of 2.0 wt. % glycerin to Base C resulted in the prevention of the emulsion of test sample 12 from breaking after the freeze-thaw cycles.

Test samples 13-14 included the Base D formula. The Base D formula contains an optional solvent, ethanol. Base D is not freeze-thaw stable, but the addition of 1.0 wt. % glycerin resulted in test sample 14 being able to re-form the emulsion by simple shaking after breaking.

Test samples 15-19 included the Base E formula. The Base E formula contains more than one hydrocarbon solvent and an optional fragrance. When 0.5 wt. % of glycerin was added to Base E, the emulsion still broke after the freeze-thaw test. However, at this same concentration, glycerin enabled freeze-thaw stability for Base A (see Test number 2). After increasing the concentration of glycerin to 1.0 wt. % with the Base E formula, simple shaking re-formed the emulsion. This indicates that, for each different emulsion system, there may be a different minimum stabilizer concentration for re-forming the emulsion after breaking the emulsion in a freeze-thaw cycle. When the concentration of glycerin was further increased to 3.0 wt. % with the Base E formula, the emulsion remained stable after the freeze-thaw cycles. This demonstrated that there is another critical concentration, above which the stabilizer can prevent the emulsion from breaking. In Test sample 19, two freeze-thaw stabilizers were used together. Glycerin was included at 1.0 wt. %, while D-sorbitol was included at 2.0 wt. %. The freeze-thaw stabilizers prevented the emulsion from breaking after the freeze-thaw cycles.

A preferred inventive aerosol formula example is set forth below.

| Ingredient Name | Component Type | Wt. % |
|---|---|---|
| Deionized water | Water | 76.55 |
| ISOPAR E (C7-C9 branched alkanes) | Hydrocarbon solvent | 14.00 |
| Silicone oil, 100 cSt | Film former | 6.00 |
| SPAN 80 (sorbitan monooleate) | Emulsifier | 1.00 |
| Glycerin | Stabilizer | 1.00 |
| Compressed nitrogen gas | Propellant | 0.80 |
| Fragrance | Fragrance | 0.60 |
| Bronopol | Preservative | 0.05 |

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

It is claimed:

1. A freeze-thaw stable, water-in-oil (W/O) emulsion cleaning and/or polish composition comprising
   (a) at least one hydrocarbon solvent including at least one alkane hydrocarbon,
   (b) about 0.01 to about 1 wt. % of at least one freeze-thaw stabilizer including one or more of a polyol, sugar, polar aprotic solvent, and amphoteric compound,
   (c) at least one nonionic emulsifier having an HLB value of about 2 to about 6, and
   (d) water,
   wherein (a), (b), (c) and (d) are present in sufficient amounts to form a W/O emulsion composition in which a water phase is uniformly dispersed in an oil phase,
   wherein said at least one freeze-thaw stabilizer is present in an amount sufficient to provide freeze-thaw stability to said composition by either (1) preventing said emulsion composition from breaking upon being subjected to a freeze-thaw cycle or (2) providing by shaking of the emulsion composition re-formation of the emulsion composition following breaking in a freeze-thaw cycle, and
   wherein said cleaning and/or polish composition has an easier wipeout as compared to said cleaning and/or polish composition in absence of said freeze-thaw stabilizer.

2. The W/O emulsion cleaning and/or polish composition of claim 1, wherein said at least one freeze-thaw stabilizer is one or more of glycerin, sorbitol, ethylene glycol, maltitol, sucrose, glucose, dimethyl sulfoxide and lauryl dimethyl amine oxide.

3. The W/O emulsion cleaning and/or polish composition of claim 1, wherein said hydrocarbon solvent is a saturated or unsaturated hydrocarbon solvent.

4. The W/O emulsion cleaning and/or polish composition of claim 1, wherein said at least one hydrocarbon solvent is present in an amount of about 3 to about 40 wt. %; said at least one nonionic emulsifier is present in an amount of about 0.01 to about 5 wt. %; said water is present in a balance for said composition to equal 100 wt. %.

5. The W/O emulsion cleaning and/or polish composition of claim 1, wherein said composition is included in a furniture care product, a shoe care product or an auto care product.

6. A freeze-thaw stable furniture care, shoe care or auto care product comprising
   (a) at least one hydrocarbon solvent including at least one alkane hydrocarbon;
   (b) at least one nonionic emulsifier having an HLB value of about 2 to about 6;
   (c) about 0.01 to about 1 wt. % of at least one freeze-thaw stabilizer including one or more of a polyol, sugar, polar aprotic solvent, and amphoteric surfactant;
   (d) at least one film-former component selected from silicones and waxes;
   (e) one or more of a film-former component, surfactant, solvent, fragrance component, preservative, and colorant; and
   (f) water;
   wherein (a), (b), (c), (d), and (e) and (f) are present in sufficient amounts to form a W/O emulsion composition in which a water phase is uniformly dispersed in an oil phase;
   wherein said at least one freeze-thaw stabilizer is present in an amount sufficient to provide freeze-thaw stability to said product by either (1) preventing said emulsion composition from breaking upon being subjected to a freeze-thaw cycle or (2) providing by shaking of the emulsion composition re-formation of the emulsion composition following breaking in a freeze-thaw cycle; and wherein said product has an easier wipeout as compared to said product in absence of said freeze-thaw stabilizer.

7. The product of claim 6, wherein said at least one freeze-thaw stabilizer is one or more of glycerin, sorbitol, ethylene glycol, maltitol, sucrose, glucose, dimethyl sulfoxide, and lauryl dimethyl amine oxide.

8. The product of claim 6, wherein said hydrocarbon solvent is a saturated or unsaturated hydrocarbon solvent.

9. The product of claim 6, wherein said at least one hydrocarbon solvent is present in an amount of about 3 to about 40 wt. %; said at least one nonionic emulsifier is present in an amount of about 0.01 to about 5 wt. %; component of (e) is present in an amount of about 0.001 to about 20 wt. %; and said water is present in a balance for said product to equal 100 wt. %.

10. A freeze-thaw stable aerosol furniture care, shoe care or auto care product consisting of (a) a propellant including compressed gas or LPG propellant;

(b) a freeze-thaw stable water-in-oil (W/O) emulsion composed of (1) at least one hydrocarbon solvent including at least one alkane hydrocarbon;

(2) at least one nonionic emulsifier having an HLB value of about 2 to about 6;

(3) about 0.01 to about 1 wt. % of at least one freeze-thaw stabilizer including one or more of a polyol, sugar, polar aprotic solvent and amphoteric surfactant;

(4) water; and (5) optionally, one or more of a film-former, solvent, surfactant, fragrance component, preservative, and colorant;

wherein said propellant and said W/O emulsion are present in amounts to total 100 wt. %;

wherein said freeze-thaw stabilizer is present in a sufficient amount to provide freeze-thaw stability to said product by either (1) preventing said emulsion from breaking upon being subjected to a freeze-thaw cycle, or (2) enabling said W/O emulsion to be re-formed by shaking following breaking in a freeze-thaw cycle; and wherein said product has an easier wipeout as compared to said product in absence of said freeze-thaw stabilizer.

11. The product of claim 10, wherein said at least one freeze-thaw stabilizer is one or more of a glycerin, ethylene glycol, sorbitol, maltitol, sucrose, glucose, dimethyl sulfoxide and lauryl dimethyl amine oxide.

12. The product of claim 10, wherein said hydrocarbon solvent is a saturated or unsaturated hydrocarbon solvent.

13. The product of claim 10, wherein said propellant is present in an amount of about 0.1 to about 25 wt. %; said at least one hydrocarbon solvent is present in an amount of about 3 to about 40 wt. %; said at least one nonionic emulsifier is present in an amount of about 0.01 to about 5 wt. %; optional component of (5) is present in an amount of about 0.001 to about 20 wt. %; and said water is present in a balance for said product to equal 100 wt. %.

* * * * *